No. 607,585. Patented July 19, 1898.
L. M. CHAPMAN & J. M. GELATT.
NUT LOCK.
(Application filed Mar. 28, 1898.)
(No Model.)
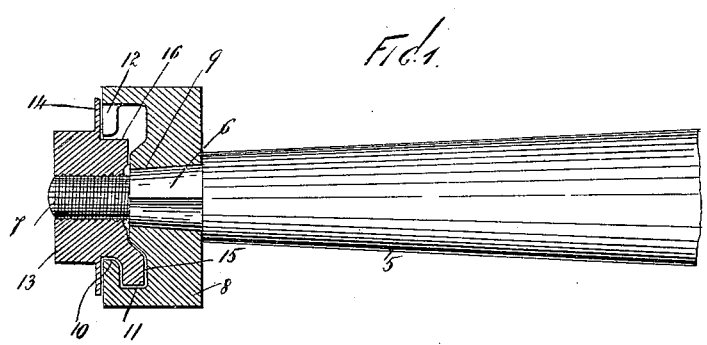
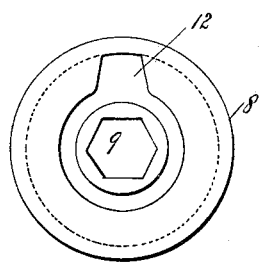
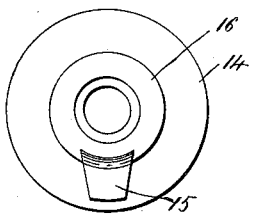
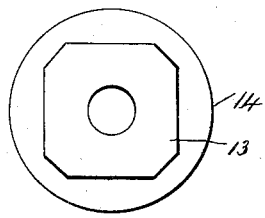
WITNESSES
INVENTORS
Leo M. Chapman
James M. Gelatt
BY
Edgar Tate & Co.
ATTORNEYS

United States Patent Office.

LEO MILLER CHAPMAN AND JAMES MADISON GELATT, OF LOUISVILLE, KENTUCKY.

NUT-LOCK.

SPECIFICATION forming part of Letters Patent No. 607,585, dated July 19, 1898.

Application filed March 28, 1898. Serial No. 675,461. (No model.)

*To all whom it may concern:*

Be it known that we, LEO MILLER CHAPMAN and JAMES MADISON GELATT, citizens of the United States, residing at Louisville, in the county of Jefferson and State of Kentucky, have invented certain new and useful Improvements in Nuts, of which the following is a full and complete specification, such as will enable those skilled in the art to which it appertains to make and use the same.

This invention relates to nut-locks; and the object thereof is to provide a simple and effective device of this class which is particularly adapted for use in connection with the spindles of wagons, carriages, and other vehicles, but which may also be used wherever nut-locks are required.

The invention is fully disclosed in the following specification, of which the accompanying drawings form a part, in which the separate parts of our improvement are designated by the same numerals of reference in each of the views, and in which—

Figure 1 is a side view of a portion of the spindle of a vehicle, showing our improved nut and lock in section. Fig. 2 is a front view of the nut with the lock removed. Fig. 3 is a back view thereof, and Fig. 4 is a front view of the lock.

In the drawings forming part of this specification we have shown at 5 the end of the spindle of a wagon or other vehicle, and this spindle is preferably slightly conical in form, being smallest at the outer end. The spindle 5 is provided with an extension 6, which is preferably hexagonal in cross-section and which is also slightly conical in form and provided with a screw-threaded cylindrical extension 7. The extension 6 need not necessarily be hexagonal in form, as it may be provided with any desired number of sides, and we also provide a nut 8, which is provided with a central opening 9, which is of the same form as the extension 6 of the spindle 5, and formed in the front or outer side of the nut 8 is a central opening 10, in the outer wall of which is formed an annular chamber 11, which communicates therewith throughout its extent, and the outer wall of the annular chamber 11 is provided with a notch or recess 12, which also communicates with the opening 10.

We also provide a lock consisting of a nut 13, which is adapted to be screwed onto the screw-threaded extension 7 of the spindle, and the nut 13 is provided about centrally of its perimeter with an annular flange or rim 14, and formed on one side of said nut is an angular lug or projection 15, which is adapted to be passed through the notch or recess 12 and enter the annular chamber 11 and turn therein.

It will be observed that the nut 8 cannot turn on the extension 6 of the spindle and that the lock-nut 13 may be connected with the nut 8 by simply passing the lug or projection 15 through the notch or recess 12 into the annular chamber 11, in which operation a part 16 of the nut 13 enters the annular opening 10 in the nut 8 and is adapted to turn therein.

The operation is substantially as follows: The lock-nut 13 is first connected with the nut 8 by passing the angular lug or projection 15 into the annular chamber 11, as hereinbefore described, and when the parts are thus connected the flange or rim 14 of the nut 13 will rest on the outer surface or front side of the nut 8 and close the notch or recess 12. The nut 8 is then passed over the screw-threaded extension 7 of the spindle and the lock-nut 13 is screwed onto said extension, and in this operation the nut 8 is forced onto the extension 6 of the spindle, as shown in Fig. 1. It will be apparent that the part 8 cannot be turned on the extension 6 in the operation of the vehicle, and this being the case the lock-nut 13 will also remain stationary, and the accidental removal of the nut 8 or the loss thereof from the spindle will not be possible.

It will also be apparent that our improved nut-lock may be employed in almost any position where devices of this class are required, and many changes in and modifications of the construction herein described may be made without departing from the spirit of our invention or sacrificing its advantages.

Having fully described our invention, we claim as new and desire to secure by Letters Patent—

1. A nut-lock, comprising a main nut having a central angular opening which passes therethrough, an annular chamber in the outer side thereof, and a circular opening which communicates therewith, the outer wall of said annular chamber being provided with a notch or recess which communicates with said opening, and a supplemental nut the inner side of which is adapted to enter the said circular opening, said lock-nut being provided with an angular lug or projection and with an annular flange or rim which is adapted to close said opening, substantially as shown and described.

2. A nut-lock, comprising a main nut which is provided with a central angular opening which passes therethrough, an annular chamber in the outer side thereof, a circular opening which communicates therewith, and a supplemental nut which is provided with a central screw-threaded bore, and on one side thereof with a lug or projection which is adapted to enter said annular chamber, said main nut and said supplemental nut being adapted to be used in connection with a spindle having an angular extension on which is formed a screw-threaded projection, substantially as shown and described.

3. In a nut-lock, the combination with a spindle provided with an angular extension on which is formed a screw-threaded extension, of a nut which is provided with a central angular opening and in the outer side thereof with a circular opening in the outer wall of which is formed an annular chamber, and a nut one side of which is adapted to enter said annular opening, said side of said nut being also provided with a lug or projection which is adapted to enter said annular chamber, substantially as described.

4. The combination with a spindle, rod or similar device provided with an angular extension on which is formed a screw-threaded extension, of a nut provided with a central angular opening which is adapted to receive said angular extension, said nut being provided in one side thereof with a circular opening in the outer wall of which is formed an annular chamber, and a nut one side of which is adapted to enter said opening, said nut being also provided with a lug or projection which is adapted to enter said annular chamber and with a flange or rim, substantially as described.

In testimony that we claim the foregoing as our invention we have signed our names, in presence of the subscribing witnesses, this 23d day of March, 1898.

LEO MILLER CHAPMAN.
JAMES MADISON GELATT.

Witnesses:
T. J. CLANCY,
GEO. H. FISHER.